(12) United States Patent
Zhao et al.

(10) Patent No.: US 10,243,332 B1
(45) Date of Patent: Mar. 26, 2019

(54) METHOD OF REPLACING PIPE-TYPE POWER CABLES WITH EXTRUDED-DIELECTRIC CABLES

(71) Applicant: Electric Power Research Institute, Inc., Charlotte, NC (US)

(72) Inventors: Tiebin Zhao, Charlotte, NC (US); Jay A. Williams, Essex, CT (US)

(73) Assignee: Electric Power Research Institute, Inc., Charlotte, NC (US)

( * ) Notice: Subject to any disclaimer, the term of this patent is extended or adjusted under 35 U.S.C. 154(b) by 0 days.

(21) Appl. No.: 15/695,404

(22) Filed: Sep. 5, 2017

(51) Int. Cl.
| F16L 1/032 | (2006.01) |
| F16L 55/18 | (2006.01) |
| H02G 1/08 | (2006.01) |
| H02G 9/06 | (2006.01) |
| F16L 1/06 | (2006.01) |
| F16L 55/165 | (2006.01) |

(52) U.S. Cl.
CPC .............. *H02G 1/081* (2013.01); *F16L 1/032* (2013.01); *F16L 1/06* (2013.01); *F16L 55/1658* (2013.01); *F16L 55/18* (2013.01); *H02G 9/06* (2013.01)

(58) Field of Classification Search
CPC ....... F16L 55/1658; F16L 1/028; F16L 55/18; H02G 1/08; H02G 9/06
USPC ................... 405/183.5, 184, 184.3
See application file for complete search history.

(56) References Cited

U.S. PATENT DOCUMENTS

| 4,767,236 A * | 8/1988 | Rice | E03F 3/06 405/184.3 |
| 5,011,332 A * | 4/1991 | Kunze | G02B 6/4464 138/128 |
| 5,192,165 A * | 3/1993 | Torielli | E21B 7/30 138/111 |
| 5,713,700 A * | 2/1998 | Vogelsang | H02G 1/086 138/108 |
| 5,816,745 A * | 10/1998 | Tenbusch, II | E21B 7/30 138/98 |
| 6,134,766 A * | 10/2000 | Sievert | G02B 6/4464 138/128 |
| 6,305,880 B1* | 10/2001 | Carter | B23D 21/02 175/53 |
| 6,377,734 B1* | 4/2002 | Mayr | G02B 6/4463 385/100 |
| 7,095,930 B2* | 8/2006 | Storaasli | G02B 6/504 385/100 |
| 7,255,516 B2* | 8/2007 | Wentworth | E21B 4/14 405/184.3 |
| 7,806,629 B2* | 10/2010 | McCoy | H02G 9/08 211/60.1 |
| 2002/0044837 A1* | 4/2002 | Paletta | E03F 5/022 405/184.3 |
| 2007/0036613 A1* | 2/2007 | Tjader | B23D 21/02 405/184.3 |
| 2009/0285635 A1* | 11/2009 | Tjader | F16L 55/1658 405/184.3 |

* cited by examiner

*Primary Examiner* — Frederick L Lagman
(74) *Attorney, Agent, or Firm* — Trego, Hines & Ladenheim, PLLC; Jonathan Hines; Brandon Trego

(57) ABSTRACT

A method of replacing pipe-type power cables is disclosed. The method includes the steps of using a pipe cutting rod to burst existing pipe; using an expander to expand soil surrounding the existing pipe to create a path for a new conduit or pipe; pulling the new conduit or pipe into the path created by the expander; and pulling new cables into the conduit or pipe.

15 Claims, 2 Drawing Sheets

METHOD OF REPLACING PIPE-TYPE POWER CABLES WITH EXTRUDED-DIELECTRIC CABLES

BACKGROUND OF THE INVENTION

This invention relates generally to a method of replacing existing pipe-type power cables with extruded-dielectric cables.

Pipe-type power cables have been the backbone of underground transmission systems in North America for more than 80 years. It is estimated that the United States and Canada have between 3000 and 4000 circuit miles of underground buried steel pipe which contain three-phase paper insulated power cables. Some estimates indicate that more than one-half of this amount of buried pipe-type cables are more than 50 years old.

The cables inside the pipe are provided individually, one for each phase. Each metallic conductor is insulated with a paper-based insulation. The space inside of the pipe with the cables is filled with a dielectric fluid. This design has proven to be robust and reliable; however, there are some drawbacks: (1) the fluid-filled configuration is not considered to be environmentally friendly in the event of a leak; and (2) there are very few companies which manufacture the cables that go into the buried pipe; thus replacing a failed pipe-type cable or reconductoring the pipe with pipe-type cable may not be feasible in the future.

One solution is to replace the pipe-type cables with extruded-dielectric cables, still using the existing pipe. Extruded-dielectric cables do not require dielectric fluid and have both operational and maintenance advantages. Extruded-dielectric cables use a polymer-based insulation. However, based on the current industry requirements, the insulation wall thickness and the outside diameter of each cable using the polymer insulation and the same metallic conductor diameter are greater than those of the paper-based insulated cable, respectively. Therefore, to replace the paper-insulated cables with the polymer-insulated cables, the diameter of the metallic conductor of the polymer-insulated cable would be reduced, if the same existing buried pipe is used. The reduction of the metallic conductor diameter would result in an electric current capacity reduction. In addition, the steel pipe that surrounds the polymer-insulated cable has magnetic losses, and the pipe causes an increase in the electrical losses of the polymer-insulated cables themselves. The heat generated by these losses further reduces the electric current capacity.

On occasion, utilities have replaced the paper insulated cables with extruded-dielectric cables, accepting the lower circuit ratings; however, such reduction is not acceptable by most end-users who wish to have the same or greater current carrying capacity. As a result, the utilization of extruded-dielectric cable with existing buried steel pipe has been impeded.

Accordingly, there is a need for a method of replacing existing pipe-type cable systems with pipe and/or conduit of larger diameters to accommodate the installation of extruded-dielectric cables that can meet power transfer demands equal to or greater than the existing pipe-type cable circuits.

BRIEF SUMMARY OF THE INVENTION

This need is addressed by the present invention, which bursts existing steel pipe of pipe-type cable systems, inserts new pipe and/or conduit that allows installing a larger diameter cable conductor through the same route with minimal requirements for pavement breaking, excavations, duct bank installation, backfilling, repaving, and traffic control.

According to one aspect of the invention, a method of replacing pipe-type power cables, includes the steps of using a pipe cutting rod to burst existing pipe; using an expander to expand soil surrounding the existing pipe to create a path for a new conduit or pipe; pulling the new conduit or pipe into the path created by the expander; and pulling new cables into the conduit or pipe.

According to another aspect of the invention, a method of replacing pipe-type power cables includes the steps of placing pulling equipment in a receiving pit; connecting a pipe cutting rod to an expander and connecting a first conduit or pipe to the expander to form a connected assembly, the connected assembly being positioned in a launching pit; connecting the pipe cutting rod to the pulling equipment; using the pulling equipment to pull the connected assembly into a path where an existing pipe exists from the launching pit to the receiving pit; during the step of pulling the connected assembly, using the pipe cutting rod to burst the existing pipe; and using the expander to expand soil surrounding the existing pipe to create an expanded path for the first conduit or pipe; and pulling new cables into the first conduit or pipe.

According to another aspect of the invention, a method of replacing pipe-type power cables includes the steps of locating a launching pit at a first end of a buried pipe having pipe-type power cables contained therein; locating a receiving pit at a second end of the buried pipe; removing the pipe-type power cables from buried pipe; pulling a connected assembly having a pipe cutting rod, an expander, and a first conduit or pipe into a path occupied by the buried pipe from the launching pit to the receiving pit; during the step of pulling the connected assembly, using the pipe cutting rod to burst the buried pipe; and using the expander to expand soil surrounding the buried pipe to create an expanded path for the first conduit or pipe; and pulling extruded-dielectric cables into the first conduit or pipe.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
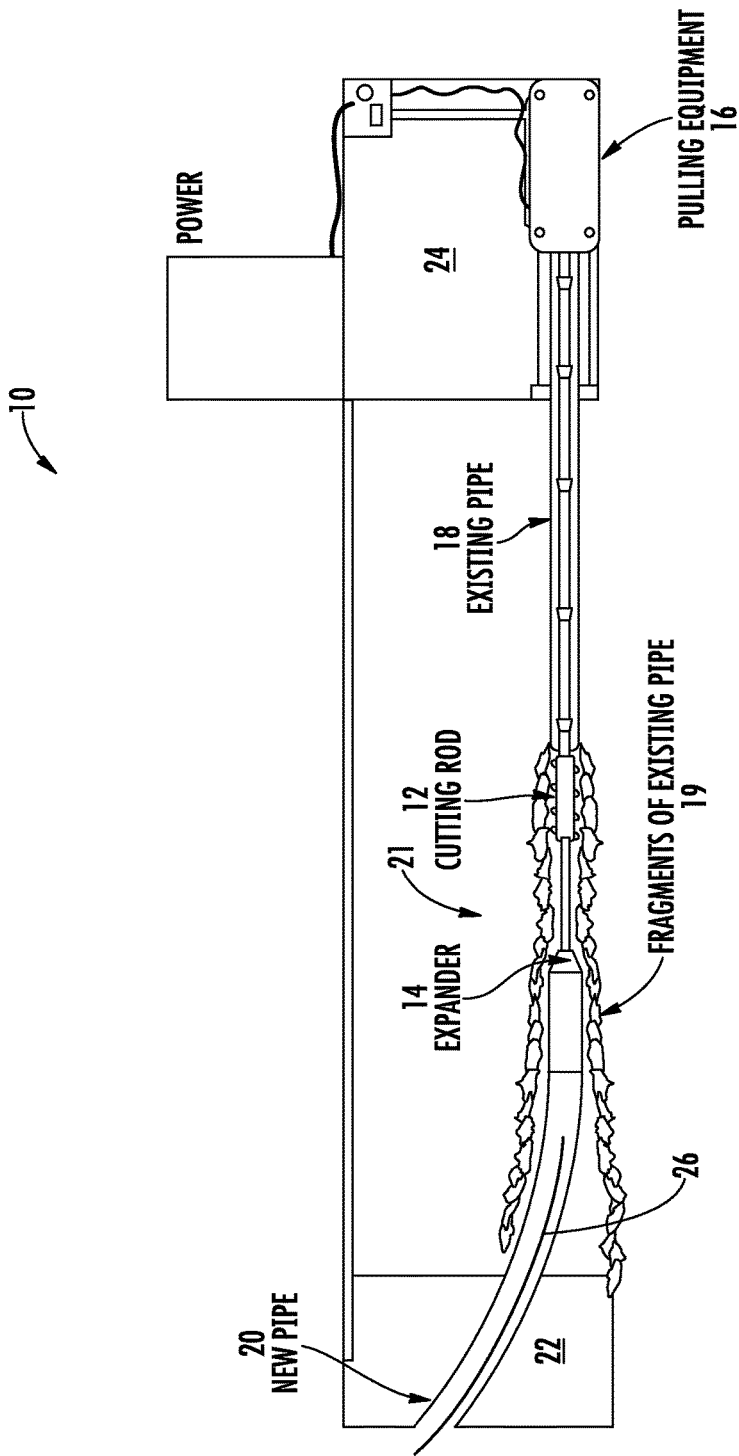
FIG. 1 illustrates a method according to an embodiment of the invention.

Referring to the drawings wherein identical reference numerals denote the same elements throughout the various views, FIG. 1 illustrates a method 10 of replacing pipe-type power cable circuits with extruded-dielectric cables. In general, the method 10 uses pipe bursting technology for pipe-type power cable pipes and includes the use of a pipe cutting apparatus such as cutting rod 12, an expander 14, and pulling equipment 16. It should be appreciated that the method 10 may also be used in distribution cable circuits in critical areas such as major road crossings, water crossing, etc.

The method 10 first removes existing pipe-type power cables from existing steel pipes 18 in which they are housed.

The cutting rod 12 is then used to burst the existing steel pipe 18 in such ways that the fragments or shards 19 of the pipe pieces are forced into surrounding soil to prevent such shards from damaging a new pipe or conduit 20 being pulled in by the pulling equipment 16. Damage to the new conduit 20 may affect the long-term performance of the cable. Since the existing steel pipe 18 is broken open or into pieces, the magnetic path of the steel pipe 18 is broken, which can significantly reduce the magnetic losses caused by the steel pipe 18, and therefore increase the overall rating of a new cable circuit. As illustrated, the pulling equipment 16 is operably connected to the cutting rod 12, the expander 14, and the new conduit 20 which may or may not include new extruded-dielectric cables 26 therein.

The new conduit 20 may be made of materials that are suitable for the present application and which provide a long operating life, such as, but not limited to, polyvinylchloride (PVC), high density polyethylene, or other suitable polymer pipe construction suitable for the thermal environments of a power cable. A slip liner of specific materials may also be used. A steel pipe could also be used to provide additional protection from dig-in, but losses caused by the steel pipe would reduce the power transfer of the cables. The conduit 20 has a larger diameter than steel pipe 18 to accommodate the use of extruded-dielectric cables 26 having a polymer-based insulation to maintain current carrying capacity and provide additional capacity. The larger diameter could also permit installing a separate polyethylene pipe along with the three power cables. Water could be circulated through this separate pipe to provide an even larger increase in current-carrying capacity. Water could also be circulated through the conduit, providing a go-and-return flow in the same conduit.

The advantage of using steel pipe is that the steel pipe is much stronger and can be pulled through an expanded opening for longer distances; has a smaller wall thickness which allows for a larger area for installing cables; extruded-dielectric cables may be optimized for operation in a steel pipe; and utilities may still want to install paper-insulated pipe-type cables since existing equipment and substations could be re-used. It is not feasible to operate paper-insulated pipe-type cables in a polymer pipe due to long term moisture intrusion that reduces the insulating properties of the paper. The method 10 allows a larger steel pipe, so larger conductor pipe-type cables, and/or larger conductor pipe-type cables at higher voltages can be installed.

The method 10 includes the excavation of suitable launching and receiving pits 22, 24 (where necessary) having an optimal distance therebetween to burst pipe 18, pull new conduit 20, and minimize the impact of excavating streets. The use of existing joint manholes where suitable may also be used instead of excavating pits 22, 24 or used in combination with pits 22, 24 to minimize the impact of excavating the streets where existing pipes are located. The launching and receiving pit configurations also depend on existing steel pipe sizes and backfill materials.

Once the pits 22, 24 have been excavated and/or manholes located, the pulling equipment 16 is placed in receiving pit 24 or the desired manhole. The cutting rod 12, expander 14, and conduit 20 (together form a connected assembly 21) are pulled from the launching pit 22 or desired manhole along the path occupied by the pipe 18 to allow the cutting rod 12 to burst the pipe 18 with great force into fragments or shards which are forced into surrounding soil. As the cutting rod 12 bursts the pipe 18, the expander 14 expands the path where pipe 18 laid to accommodate conduit 20. Conduit 20 is pulled into the path to provide a conduit for the installation of new extruded-dielectric cables 26 having larger cable diameters and therefore increased cable circuit ratings. With the conduit 20 installed, the extruded-dielectric cables 26 are pulled through the conduit 20. Additionally, a two to three inch diameter polyethylene pipe could be pulled into the conduit 20 along with the cables 26 to provide a communications path where one did not exist before.

The size, i.e. diameter, of the expander 14 may be increased or decreased based on factors such as soil type and/or material where the existing pipe runs through and a desired heat transfer. For example, where heat transfer is not an important factor, dead air space between the soil and the conduit 20 may be two to four inches, thereby allowing for a larger expander 14 to be used and allowing for easier pulling of the conduit 20. In cases where heat transfer from the conduit 20 into the soil is important, a smaller expander 14 may be used to minimize dead air space, for example, one to two inches. This is possible because steel pipe deformation is a plastic deformation; thus, it is unlikely that the compacted soil will push the pipe back into its original diameter which would greatly increase the friction force needed to pull the conduit 20.

Figure 2:
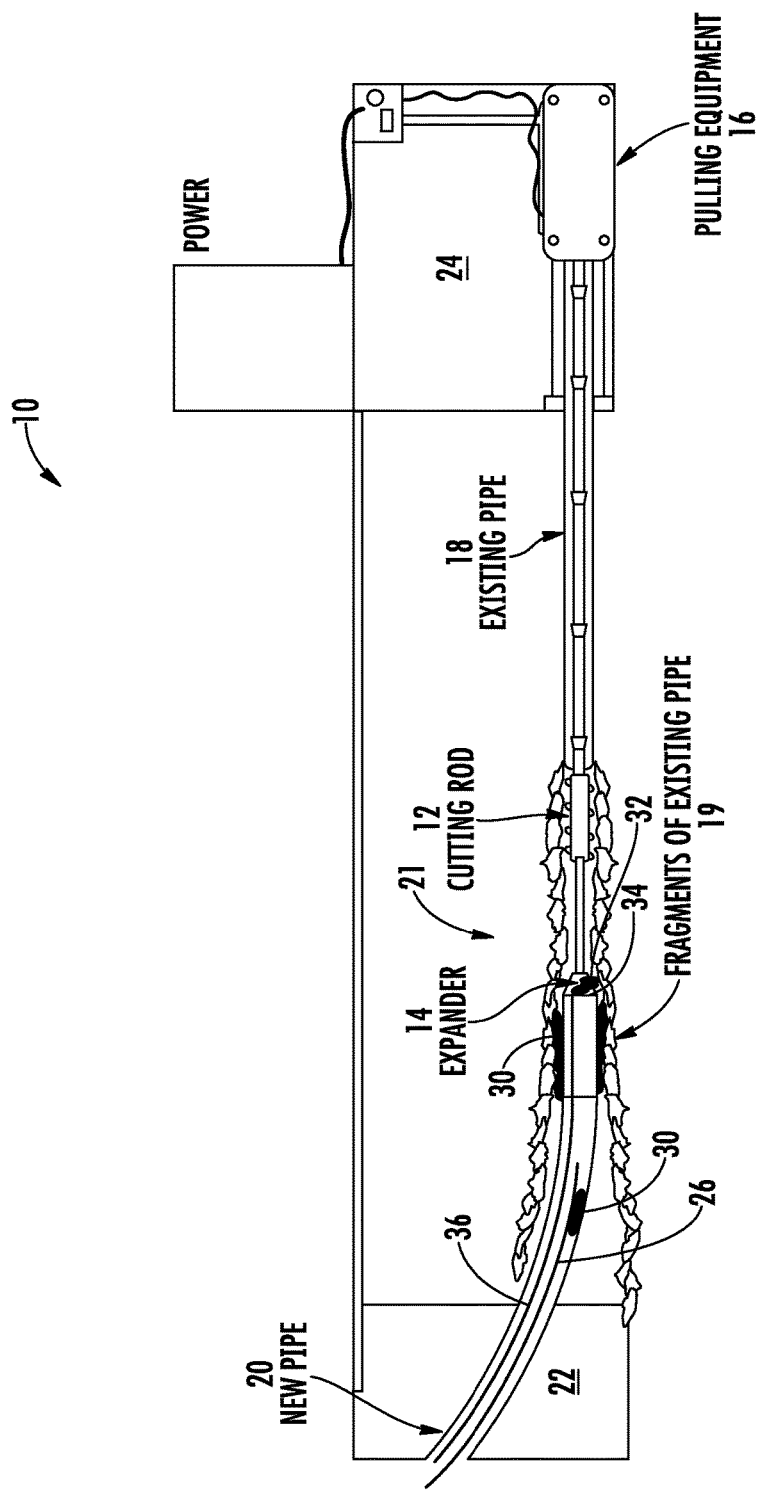
FIG. 2 illustrates the use of grout and/or lubricant in the method of FIG. 1.

As shown in FIG. 2, the method 10 may also utilize a non-setting grout 30 and/or lubricant 32. The grout 30 may be used on the inside of the conduit 20, outside of the conduit 20, or both. The grout 30 would (1) have good thermal resistivity to improve heat transfer and power cable rating; (2) be a fluid with low viscosity when installed but would congeal to very high viscosity after installation to reduce the chance of forming air pockets; (3) would return to low viscosity when energy is applied to the fluid to permit removal of the cables in the event of cable failure or for reconductoring; and (4) provide buoyancy to the cables to reduce their effective weight and allow pulling cables longer distances.

Injecting the grout 30 inside of the conduit improves heat transfer between the extruded-dielectric cables 26 and the conduit 20 by eliminating dead air space between the cables 26 and the conduit 20. Injecting the grout 30 outside of the conduit 20 would allow the dead air space between the pipe and the soil to be filled and improve heat transfer from the conduit 20 into the soil. As discussed above, the expander 14 expands the path to permit installation of the conduit 20. As a result, the expander 14 must be several inches larger in diameter than the replacement pipe or conduit 20 to allow pulling of the replacement pipe or conduit 20 without damage. The surrounding soil that has been compacted by the expander 14 may eventually fill-in the dead air space between the conduit 20 and the soil; however, this may not be the case in some soils or in the case of concrete envelopes no fill-in would occur. Thus, the grout 30 would allow for a larger expander 14 to be used and still maintain the benefits of heat transfer into the soil. The grout 30 may also act as a lubricant for pulling the conduit 20, thereby making it easier to pull the conduit 20.

The lubricant 32 may also be injected outside of the conduit 20 to reduce friction and allow for greater lengths of conduit 20 to be pulled. The lubricant 32 may be either a bentonite-based fluid or a polymer lubricant depending on soil conditions. The lubricant 32 may be injected at a leading end 34 of the conduit 20 via a small diameter flexible pipe 36 installed inside a length of the conduit 20. This small flexible pipe 36 would then be removed before installing cables 26. It should be appreciated that the pipe 36 may also be used to inject the grout 30 into the conduit 20.

The method 10 may also be used replace fluid return lines with a new cable circuit. Many pipe-type cable systems use forced cooling of the dielectric liquid contained in the steel pipes by utilizing a five to six inch steel pipe for fluid return. This fluid return pipe is typically contained in the same trench, a foot or so away, as the cable pipe. By utilizing the method 10, the fluid return pipe may be replaced with another conduit 20 to add a new cable circuit.

The result of the method 10 is a faster, lower cost installation (none to minimal trenching) and less environmental impact and fewer permitting requirements, using existing assets to provide an increased power transfer with a cable type that requires less maintenance and has operational advantages.

The foregoing has described a method of replacing pipe-type power cables with extruded-dielectric cables. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

We claim:

1. A method of replacing comprising the steps of:
    (a) using pulling equipment operably connected to a pipe cutting rod, an expander, and new conduit or pipe to pull the pipe cutting rod, expander, and new conduit or pipe through a path formed by an existing pipe, wherein the pipe cutting-rod has a diameter greater than a diameter of the existing pipe and the expander has a diameter greater than the pipe cutting rod;
    (b) using the pipe cutting rod to burst the existing pipe into fragments and force the fragments into surrounding soil, thereby enlarging the path created by the existing pipe;
    (c) after bursting the existing pipe, using the expander to expand the surrounding soil containing the fragments to further enlarge the path created by the existing pipe and create a path for a new conduit or pipe;
    (d) pulling the new conduit or pipe into the path created by the expander; and
    (e) pulling new extruded-dielectric cables into the conduit or pipe.

2. The method according to claim 1, wherein the expander forces the fragments of the burst existing pipe further into the surrounding soil to prevent the fragments from damaging the new conduit or pipe.

3. The method according to claim 1, further including the step of excavating one or more pits to permit the new conduit or pipe to be pulled into the path.

4. The method according to claim 1, further including the step of injecting a non-setting grout into the conduit or pipe, thereby filling a space between the extruded-dielectric cables and the conduit or pipe to improve heat transfer from the extruded-dielectric cables to the conduit or pipe.

5. The method according to claim 1, further including the step of injecting a non-setting grout between an outer surface of the conduit or pipe and the soil, thereby filling a space between the conduit or pipe and the soil to improve heat transfer from the conduit or pipe to the soil.

6. The method according to claim 1, further including the step of injecting a lubricant at a leading end of the conduit or pipe to reduce friction between the surrounding soil and the conduit or pipe and allow longer lengths of conduit or pipe to be pulled through the path.

7. A method of replacing pipe-type power cables, comprising the steps of:
    (a) placing pulling equipment in a receiving pit;
    (b) connecting a pipe cutting rod to an expander and connecting a first conduit or pipe to the expander to form a connected assembly, the connected assembly being positioned in a launching pit;
    (c) connecting the pipe cutting rod to the pulling equipment;
    (d) using the pulling equipment to pull the connected assembly into a path where an existing steel pipe exists from the launching pit to the receiving pit;
    (e) during the step of pulling the connected assembly,
        (i) using the pipe cutting rod to burst the existing steel pipe into fragments and force the fragments into surrounding soil, thereby enlarging the path created by the existing steel pipe and breaking any magnetic paths of the steel pipe;
        (ii) after bursting the existing steel pipe, using the expander to expand the surrounding soil containing the fragments to further enlarge the path created by the existing pipe and create an expanded path for the first conduit or pipe; and
    (f) pulling new extruded-dielectric cables into the first conduit or pipe.

8. The method according to claim 7, further including the step of removing existing pipe-type power cables from the existing pipe.

9. The method according to claim 7, further including the step of excavating the launching and receiving pits.

10. The method according to claim 7, wherein the launching pit is an existing manhole.

11. The method according to claim 7, wherein the receiving pit is an existing manhole.

12. The method according to claim 7, further including the step of positioning a second conduit smaller than the first conduit or pipe into the first conduit or pipe and injecting a lubricant through the second conduit to a leading edge of the first conduit or pipe to reduce friction between the first conduit or pipe and soil surrounding the first conduit or nine during the step of pulling the connected assembly.

13. The method according to claim 7, further including the step of injecting a non-setting grout into the first conduit or pipe, thereby filling a space between the extruded-dielectric cables and the first conduit or pipe to improve heat transfer from the extruded-dielectric cables to the first conduit or pipe.

14. The method according to claim 7, further including the step of injecting a non-setting grout between an outer surface of the first conduit or pipe and the surrounding soil, thereby filling a space between the first conduit or pipe and the surrounding soil to improve heat transfer from the first conduit or pipe to the surrounding soil.

15. A method of replacing pipe-type power cables, comprising the steps of:
    (a) locating a launching pit at a first end of a buried pipe having pipe-type power cables contained therein;

(b) locating a receiving pit at a second end of the buried pipe;
(c) removing the pipe-type power cables from buried pipe;
(d) pulling a connected assembly having a pipe cutting rod, an expander, and a first conduit or pipe into a path occupied by the buried pipe from the launching pit to the receiving pit;
(e) during the step of pulling the connected assembly,
  (i) using the pipe cutting rod to burst the buried pipe into fragments and force the fragments into surrounding soil, thereby enlarging the path created by the buried pipe;
  (ii) after bursting the buried pipe, using the expander to expand the surrounding soil containing the fragments to further enlarge the path created by the buried pipe and create an expanded path for the first conduit or pipe;
(f) pulling extruded-dielectric cables into the first conduit or pipe.

\* \* \* \* \*